United States Patent [19]

Tilman

[11] Patent Number: 5,065,899

[45] Date of Patent: Nov. 19, 1991

[54] SECTIONAL OR PRE-CUT ZIPPER STRIPS, MAGAZINE STORAGE AND FEED MEANS, AND METHOD

[75] Inventor: Paul Tilman, New York, N.Y.

[73] Assignee: Zip-Pak Incorporated, Northbrook, Ill.

[21] Appl. No.: 422,734

[22] Filed: Oct. 17, 1989

[51] Int. Cl.$^5$ .............................................. A47F 1/04
[52] U.S. Cl. ...................................... 221/305; 383/65; 24/576
[58] Field of Search .................. 221/303, 305; 24/576, 24/587; 383/65, 63

[56] References Cited

U.S. PATENT DOCUMENTS

| | | | |
|---|---|---|---|
| 3,164,298 | 1/1965 | Repko | 221/303 |
| 4,665,552 | 5/1987 | Lems et al. | 383/65 |
| 4,691,373 | 9/1987 | Ausnit | 24/576 |
| 4,736,451 | 4/1988 | Ausnit | 383/65 |
| 4,923,701 | 5/1990 | VanErden | 383/65 |

FOREIGN PATENT DOCUMENTS 2177376  1/1987  United Kingdom ............... 221/303

*Primary Examiner*—Robert P. Olszewski
*Assistant Examiner*—Kenneth Noland
*Attorney, Agent, or Firm*—Hill, Van Santen, Steadman & Simpson

[57] ABSTRACT

An extruded plastic zipper assembly comprises a pair of matching zipper strips having complementary reclosably interlocked zipper profiles with laterally extending confronting webs, and complementary non-zipper stabilizing rib means on the webs cooperating with the interlocked profiles for maintaining the webs substantially parallel to one another so that the assembly can be stacked in substantially uniform parallel relation with like zipper assemblies in a magazine package container, and a method of making the same.

27 Claims, 2 Drawing Sheets

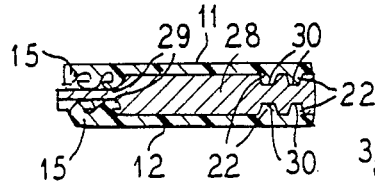
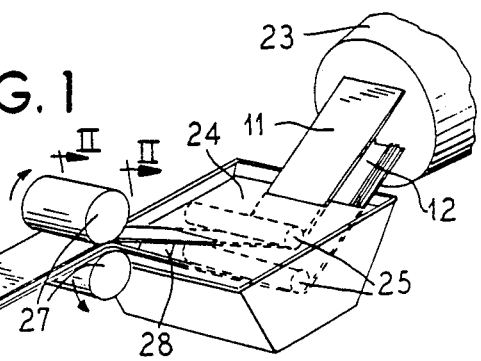
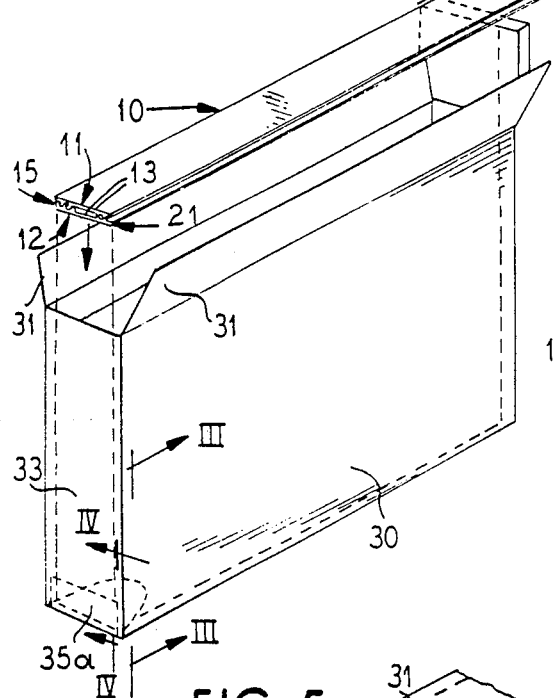
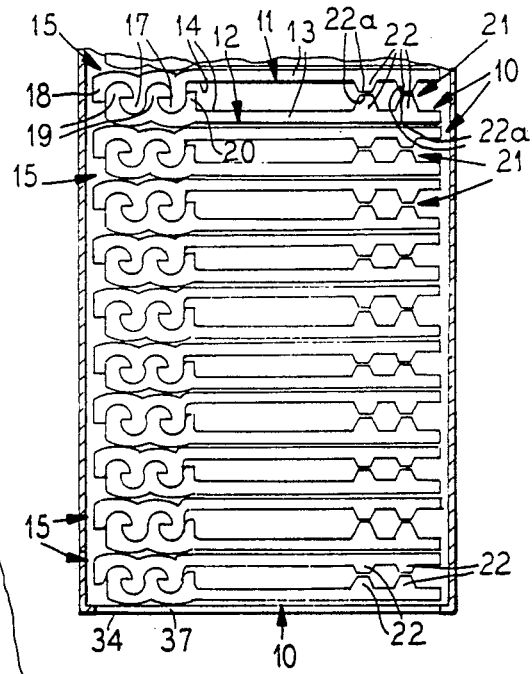
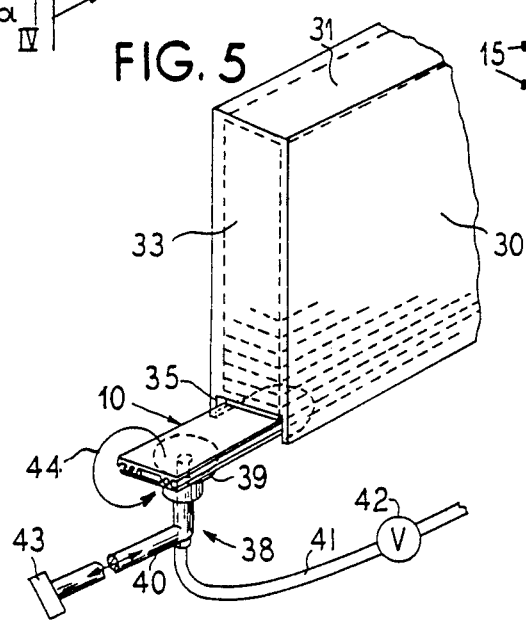

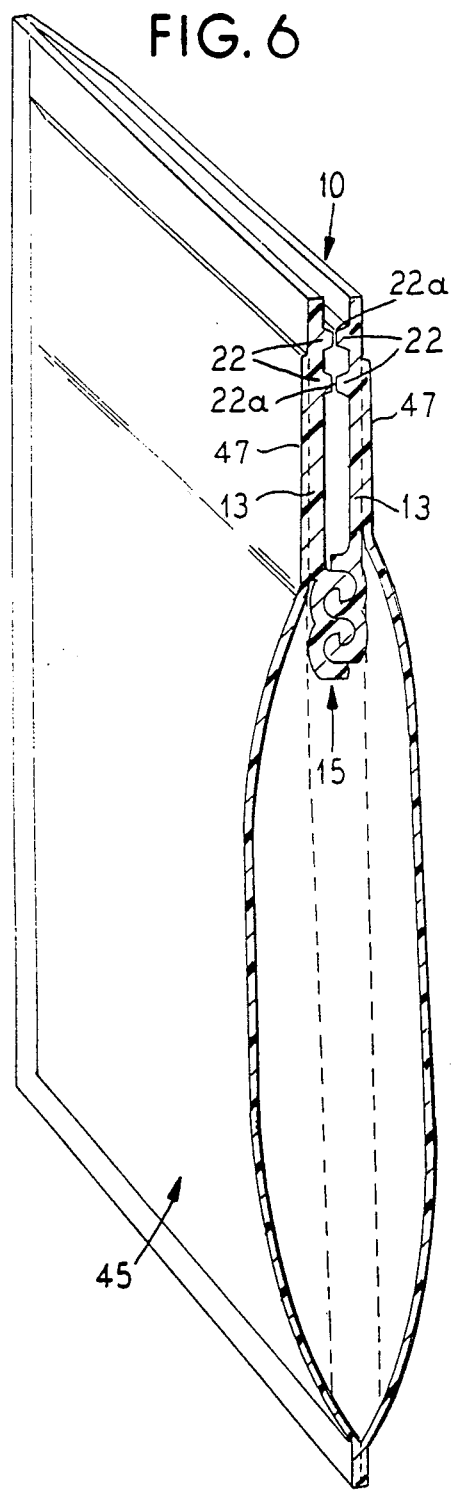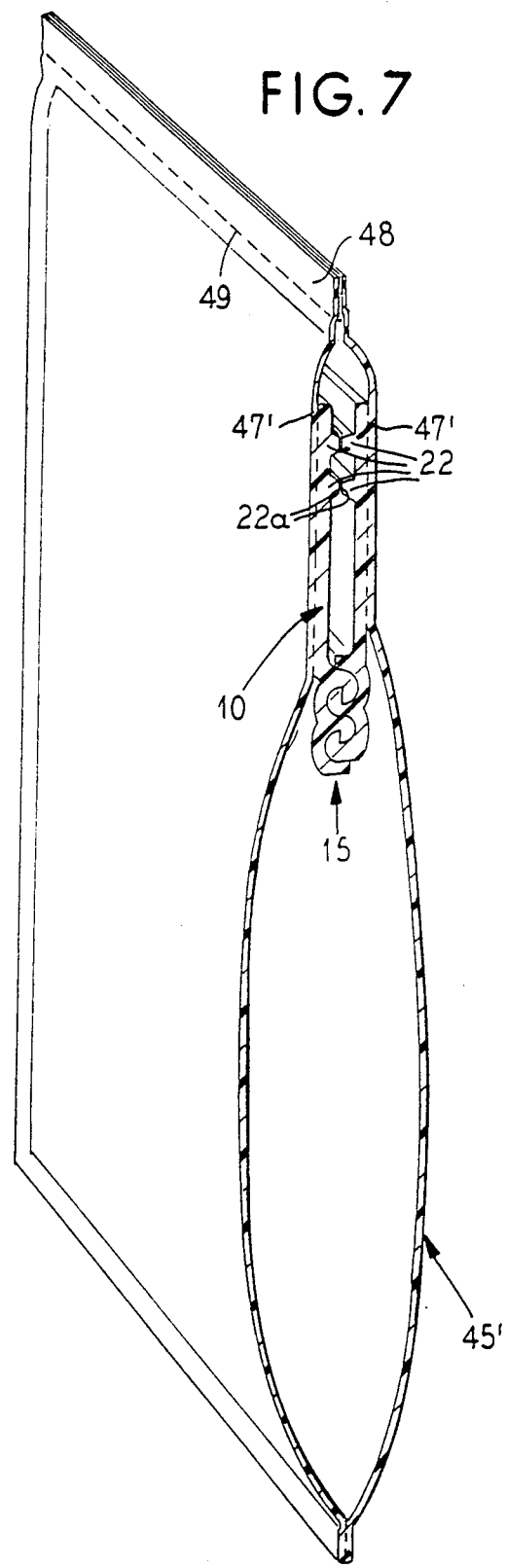

SECTIONAL OR PRE-CUT ZIPPER STRIPS, MAGAZINE STORAGE AND FEED MEANS, AND METHOD

BACKGROUND OF THE INVENTION

The present invention relates in general to extruded plastic zipper structure of the reclosably interlockable type, having pull flange extensions and adapted to be secured in any preferred manner to the mouth end portions of bags or other packages; and is more particularly concerned with providing such zipper structure in a form especially suitable to be supplied in sectional or pre-cut strips for advantageous storage and handling, and convenient attachment to and between the bag mouth end portions.

In one manner of supplying bags with plastic zippers, the zippers have been extruded integrally with the bag material so that one of the complementary zipper strips is on one of the bag walls adjacent the mouth end of the bag and the other of the complementary zipper strips is on the other of the bag walls, the zipper strips being opposingly aligned for the interlocking purpose. Examples of such structures are found in U.S. Pat. Nos. 3,565,147, Re. 27,174, 3,827,472 and 4,665,552. Each of these patents also discloses ribbing for various purposes adjacent to the zipper profiles.

Formation of the zipper strips separate from and then attached or attachable to the bag making sheet material is found at various places in the art. By way of example, U.S. Pat. Nos. 4,528,224, 4,655,862, 4,673,383, 4,709,398 and 4,731,911 are referred to as disclosing feeding of zipper strips from rolls for application in whatever length desired to bag making or package making material.

U.S. Pat. No. 4,736,451 is referred to as disclosing an interesting example of preformed and attached zipper strip wherein the male profile has adjacent thereto a stabilizing post flange structure.

A major problem with rolled or spooled extruded plastic continuous zipper strips is that they developed curvature and camber. It may be noted that winding of any flexible plastic extrusion in whatever configuration inherently distorts straightness of the finished product which is visible when the strips are removed from the spool or reel. This is almost an inevitable result of the winding systems employed which, irrespective of taper, tension or torque winding require sufficient tension to be applied to the extruded product to ensure accurate placement of that product on the spool or reel. As a result, the extruded product is in a state of flux in that it has not achieved its final fully crystallized condition before being wound due to production speed requirements. Therefore, in the extruded wound product, malleable condition stresses and strains are set into the product. As the strips are wound, subsequent shrinkage takes place over a period of time. The shrinkage virtually ensures that irrespective of the type of winding or plastic material used, the strips will tighten down to an increased degree around the spool circumference. For example, if a five foot length of extruded plastic zipper strip is laid out on a floor, it will shrink at a known rate provided both ends of the product are not trapped. The same five feet of such zipper strip wound onto a spool and trapped on either end cannot shrink over a period of time. Therefore, the strip has locked-in stress and strain that cannot be relieved.

Locked-in stress and strain can be avoided by supplying the strips in unbent and untensioned cut lengths or sections. U.S. Pat. No. 4,691,373 mentions supplying such zipper strips in individual sections having zipper profiles and laterally extending web portions or flanges. This patent also has a disclosure of forming, cooling, and joining the zipper strips into reclosable unit sections. However, a major problem with the zipper strip sections as there shown is that due to the unsymmetrical cross-sectional configuration of the strips caused by the greater mass of the zipper profiles relative to the web flanges, much difficulty has been encountered in stacking or packing the strips one upon another.

SUMMARY OF THE PRESENT INVENTION

An important object of the present invention is to provide a new and improved extruded plastic zipper strip configuration and assembly which is possessed of highly advantageous stability for supply packaging of web-flanged extruded plastic zipper strip, and a method of making the same.

Another important object of this invention is to provide a new and improved extruded plastic zipper strip arrangement which lends itself especially well to being stored in, and supplied from, a supply magazine such as for providing bags or packages with reclosable zippers.

A further important object of this invention is to provide a new and improved extruded sectional plastic zipper magazine arrangement.

Still another important object of this invention is to provide a new and improved high speed method of making plastic zipper strips and loading a supply magazine therewith.

Yet another important object of this invention is to provide a new and improved method of storing and dispensing sectional zipper strips.

In accordance with the principles of the present invention, there is provided an extruded plastic zipper assembly comprising a pair of opposingly aligned matching zipper strips, having complementary reclosably interlocked zipper profiles with laterally extending confronting webs; and complementary non-zipper, stabilizing rib means on said webs cooperating with said interlocked profiles for maintaining said webs substantially parallel to one another so that said assembly can be stacked in substantially uniform parallel relation with like zipper assemblies, and a method of making the same.

There is also provided by the present invention a new and improved extruded plastic zipper package magazine arrangement, and method.

The present invention also provides a new and improved method of extrusion manufacture of zipper assemblies, wherein stabilizing rib means beneficially stabilizes the zipper strips during the extrusion process.

Further, the present invention provides a new and improved method of continuously making the zipper assemblies and loading them into dispensing magazines.

In addition, the present invention provides new and improved bags or packages equipped with the new and improved zipper assemblies of the present invention.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 1 is a schematic perspective view illustrating continuous extrusion manufacture and dispensing magazine loading of the zipper assemblies of the present invention;

FIG. 2 is a sectional detailed view taken substantially in the plane II—II in FIG. 1;

FIG. 3 is an enlarged fragmentary vertical sectional detail view taken substantially in the plane III—III in FIG. 1;

FIG. 4 is a fragmentary vertical sectional detail view of the lower front portion of the magazine structure in FIG. 1 and taken substantially in the plane IV—IV;

FIG. 5 is a fragmentary perspective view of the front of the magazine of FIG. 1 showing it in a dispensing mode;

FIG. 6 is a fragmentary vertical sectional view through a bag or package equipped with the zipper assembly of the present invention; and FIG. 7 is a view similar to FIG. 6 but showing a modification.

DETAILED DESCRIPTION

An extruded plastic zipper assembly 10 (FIGS. 1, 3, 6 and 7) embodying the present invention comprises a pair of opposingly aligned matching zipper strips 11 and 12, each of which has a web 13 of substantial width and with faces 14 confronting one another. Complementary zipper structures 15 along one edge of the webs 13 are reclosably interlocked. In this instance, the zipper structures 15 are of the multi-rib and groove type, wherein the zipper structure of the strip 11 has along one edge of its web 13 a pair of similar, spaced generally hook-shaped profile ribs 17 and a retainer lip 18 defining grooves interlockingly receptive of complementary profile ribs 19 and retaining lip 20 on the corresponding edge of the web 13 of the zipper strip 12. The arrangement is such that the respective zipper profiles of the two strips 11 and 12 can be readily interlocked by pressing them together and can be readily separated by pulling the zipper strips apart.

Complementary stabilizing rib means 21 project from the confronting margins of the faces 14 adjacent to the edges of the webs 13 remote from the zipper structures 15. The rib means 21 cooperates with the interlocked zipper profiles in maintaining the webs 13 substantially parallel to one another so that the assembly can be stacked in substantially uniform parallel relation to like zipper assemblies, as shown in FIG. 3. Desirably, the rib means 21 comprises on each of the webs a pair of spaced parallel ribs 22 each of substantially the same shape and having a crown 22a. The crowns 22a of the ribs 22 on the web 13 of the zipper strip 11 abut the crowns 22a of the ribs 22 on the web 13 of the zipper strip 12. The combined height or thickness of the abutting ribs 22 is substantially the same as the combined height or thickness of the interlocked zipper structures 15 whereby to attain the important substantially parallel relation of the assembled zipper strips.

Manufacture of the zipper strips 11 and 12 is desirably effected by extruding the same from thermoplastic material as by means of an extruder 23 (FIG. 1) equipped with die means for coextensively extruding both of the strips in a generally downward direction into a plastic-setting liquid chilling medium 24 wherein the strips pass about respective spaced parallel guide rollers 25 and travel generally upwardly out of the chilling medium to driving pinch rolls 27 which press the two strips together and effect interlocking of the zipper structures 15.

In the course of extrusion of the zipper strips 11 and 12, the stabilizing ribs 22 by virtue of their mass substantially complement the mass of the respective zipper structures 15 and thereby ensure, in the extrusion process, substantially even and equal stress in the draw down of the zipper profiles. In other words, the ribs 22 substantially compensate for the high mass draw down of the zipper profiles, as compared to the cross-sectional masses of the webs 13. By way of explanation, as the thermoplastic material extrudes through the dies of the extruder 23, there is a substantial frictional difference in the material masses of the zipper profiles as compared to the web area of the zipper strips. By having the balancing ribs 22 along the margins of the webs 13 remote from the zipper profile, there is substantial compensation for the otherwise unbalanced stresses due to the greater mass and heat dissipation differential between the zipper profiles and the web areas. The ribs 22 balance out and provide a consistent heat reduction throughout the zipper strips 11 and 12 as they pass through the body of coolant 24. There is thus provided a substantial advantage not only in balancing out frictional differences in the dies, but also in balancing out the cooling of the balancing rib equipped zipper strips. Further, as the zipper strips 11 and 12 travel around the guide rollers 25 as drawn by the driving pinch rollers 27, substantially even tension is maintained in the strips by virtue of the substantially balanced, complementary mass distribution of the zipper profiles and the balancing ribs on the strips.

Another advantage of the balancing ribs 22 in cooperation with the zipper profiles is for guiding the strips 11 and 12 accurately into the joined relation in the pinch or closing rolls 27. As the zipper strips 11 and 12 converge toward the rolls 27, they pass across a guide means such as a bar 28 (FIGS. 1 and 2) which has guide grooves 29 for the zippers 15, and also guide grooves 30 complementary to and through which the ribs 22 are guided. This arrangement enhances high speed accuracy by avoiding any rocking or deviation of the zipper strips from the desired joining in the rolls 27.

After the zipper assembly 10 leaves the closing pinch rolls 27, the assembly is desirably maintained in a straight condition and not reeled or wound upon a roll, thereby avoiding tension distortions that inevitably occur when a freshly extruded zipper is wound onto a spool.

Although the straight line zipper assembly 10 may be, immediately after leaving the pinch or closing rolls 27, applied to bag or package making, a desirable storage and handling mode for future use comprises packaging the zipper assembly by predetermined section lengths stacked in a container 30 (FIGS. 1, 3, 4 and 5). To this end, the container 30 may comprise a carton having enclosing walls dimensioned for freely receiving a stack of predetermined length zipper assembly sections 10 stacked one upon another.

For loading the container 30, the top of the carton desirably has closure flaps 31 which can serve, when open, as guide ramps to assure undeviating reception of the zipper assembly sections 10 within the carton as the freshly formed assembly advances from the rolls 27 through a guillotine cutoff 32 which operates at relatively high speed coordinated with formation of the zipper assembly to cut off proper length sections which then drop down into the carton 30 until it is fully loaded. As shown in the drawings, the cutoff lengths have sufficient stiffness along their linear length due to the profiles and the balancing ribs to remain substantially straight as they are fed forward to be cut and dropped into the package. This stiffness is sufficient to maintain the zipper assembly substantially straight when supported in cantilever fashion over the container as illustrated in FIG. 1. Thereupon the filled package 30 is quickly replaced between section cut offs by an empty carton 30 to receive a succeeding stack of the zipper assembly sections. The top flaps 31 of the filled carton are closed and ma be sealed.

In a desirable arrangement, the package carton 30 is in the form of a dispensing magazine from which the stacked zipper sections can be dispensed one at a time. For this purpose, one of the end walls 33 of the carton and a bottom wall 34 are at there juncture provided with dispensing opening means comprising at least a dispensing opening 35 in the lower portion of the front wall 33 and extending to a height just high enough to pass the lowermost zipper assembly section therethrough longitudinally. There may be a complementary opening similar to the opening 35 in the opposite end wall so that the zipper assembly sections can be pushed out of the magazine.

On the other hand, means are desirably provided for permitting the zipper assembly sections 10 to be pulled from the package or magazine 30. To this end, the bottom wall 34 on which the lowest of the zipper strip sections rests is provided with a cutout 37, which leads into the cutout 35 in the front wall 33 and provides for access of a pneumatic feed device 38 to the lower surface of the lowermost zipper assembly strip 10. The device 38 may comprise a suction cup 39 mounted on a reciprocating arm 40 to which a suction line 41 is attached and controlled by means of a valve 42. The arm 40 is mounted in any suitable manner to reciprocate to carry the suction cup 39 into registration with the bottom wall opening 37 where the suction cup is pneumatically activated to grab the lowermost of the zipper assembly sections 10 and then by operation of a reciprocation device 43 actuated to draw the gripped zipper section out of the magazine 30 and deliver it to a point of use. After the zipper section 10 has been withdrawn from the magazine and delivered to the point of use, the device 38 may be inverted as indicated by directional arrow 44 to deposit the zipper section at the point of use. The feeding device 38 is then returned to grasp the next section 10 and feed it from the magazine.

If desired, the opening 35 may be initially closed by a frangible closure 35a which is adapted to be displaced as indicated in FIG. 4 for dispensing the zipper strip sections 10.

In FIG. 6, a bag or package 45 is depicted equipped with one of the zipper assemblies 10. In this instance, the webs 13 extend upwardly and are secured as by means of fusion or adhesive to top flanges 47 of the walls of the bag 45. The zipper structures 15 are left unattached with respect to the wall flanges 47 so that the walls of the bag can swing away from the zipper structures in the zipper structures adjacent areas of the bag wall flanges, as shown in full line as compared to the dash line collapsed condition of the bag, and thus resist opening of the zipper assembly from pressures within the bag, while permitting a relatively easy opening of the zipper assembly by applying pullapart force to the margins of the webs 13 which project beyond the top edges of the bag flanges 47 and serve as pull flanges. The ribs 22 facilitate the pullapart opening of the zipper assembly, by virtue not only of the stiffness afforded for the pull flanges of the zipper assembly, but also by maintaining the top edges of the pull flanges spaced apart so that easy digital access can be had to the pull flanges.

If preferred, the bag or package arrangement of FIG. 7 may be provided wherein the zipper assembly 10 is mounted in the bag 45' similarly as in the bag 45 in FIG. 6, except that the top end flanges 47' of the bag walls are extended above the pull flange edges of the zipper assembly 10 and serve as pull flange extensions. For tamper resistance or evidence, the extend portions of the flanges 47' may be sealed together as shown at 48. If desired, line of weakening 49 may be provided in or adjacent the sealed area 48 to facilitate tearing the same off when it is desired to gain access into the bag.

It will be understood that variations and modifications may be effected without departing from the spirit and scope of the novel concepts of the present invention.

I claim as my invention:

1. An extruded plastic zipper assembly comprising:

a pair of opposingly aligned matching zipper strips having complementary reclosable interlocked zipper profiles with laterally extending confronting webs; and complementary non-zipper stabilizing rib means on said webs cooperating with one another and with said interlocked profiles for maintaining said webs substantially parallel to one another so that said assembly can be stacked in substantially uniform parallel relation with like zipper assemblies;

said zipper strips having sufficient stiffness along their linear length to remain substantially straight when stacked and when supported in cantilever fashion and permitting the strips to remain substantially straight as they are fed forward to be cut and dropped and stacked in a receiving package.

2. An assembly according to claim 1, wherein said rib means comprise ribs integral with said webs and having crowns in abutting relation.

3. An assembly according to claim 1, wherein said rib means comprise a plurality of like spaced parallel ribs on said webs and having abutting crowns.

4. An assembly according to claim 1, wherein said zipper profiles are located along one edge of the edges of said webs, and said rib means comprise a plurality of spaced parallel ribs located adjacent to opposite edges of said webs.

5. An assembly according to claim 4, in combination with a bag or package having walls with mouth defining confronting wall flanges, said webs being fixidly attached to and between said wall flanges with said rib means located adjacent to edges of said wall flanges.

6. A combination according to claim 5, wherein said webs adjacent to said rib means provide pull flanges adapted to be pulled apart for opening said interlocked zipper profiles, and said rib means provide a stiffening structure and facilitate digital grasping of said pull flanges.

7. A combination according to claim 5, wherein said wall flanges extend beyond said zipper assembly and are secured together in tamper evident manner.

8. An assembly according to claim 1, in a predetermined length section stacked in combination with a plurality of like assembly sections in parallel relation within a handling container.

9. A combination according to claim 8, wherein said container forms a dispensing magazine having means for dispensing the stack of zipper assembly sections from the magazine one at a time.

10. A combination according to claim 9, wherein said dispensing means comprises opening means in a bottom area of the container from which the zipper assembly sections can be dispensed seriatum.

11. A combination according to claim 10, wherein said opening means comprises an opening in a lower portion of a vertical wall of the container adjacent to a bottom wall on which the lowermost of said sections is supported.

12. A combination according to claim 11, wherein said opening means includes an opening in said bottom wall associated with said vertical wall opening for permitting a dispensing device to engage the lowermost zipper assembly in the stack for dispensing it from the magazine.

13. A combination according to claim 11, including a frangible retainer across said opening and adapted to be displaced when a zipper assembly is to be dispensed from the magazine.

14. In combination in a zipper strip section dispensing magazine:
a stack of zipper strip sections;
a magazine structure housing said stack of zipper strip sections;
said magazine structure having means for dispensing the zipper strip sections seriatim from said magazine structure;
each of said sections comprising a pair of opposingly aligned matching zipper strips having complementary reclosable interlocked zipper profiles with laterally extending confronting webs, and said webs being spaced apart adjacent to said zipper profiles by the height of the zipper profiles; and
complementary, non-zipper stabilizing rib means on said webs and located adjacent to edges of said webs remote from said profiles for maintaining said webs substantially parallel to one another in said spaced relation so that the zipper strip sections in the stack are in substantially uniform parallel relation to one another;
each of said sections having sufficient linear stiffness to remain substantially straight in the stacked relationship and permitting the strips to remain substantially straight as they are fed forward to be cut and dropped and stacked in a receiving package.

15. A combination according to claim 14, wherein said magazine structure comprises a container having a top provided with means for facilitating stacking of said zipper strip sections within the container.

16. A combination according to claim 14, wherein said magazine structure has lower wall means provided with opening means for facilitating dispensing of the zipper strip sections therethrough.

17. A combination according to claim 16, wherein said opening comprises an opening in a vertical wall adjacent to a bottom wall of the magazine structure, and said bottom wall having an opening adjacent to said vertical wall opening for facilitating engagement of the zipper strips for dispensing through said vertical wall opening.

18. A combination according to claim 16, wherein said vertical wall opening has a frangible retainer means adapted to be displaced for dispensing of a zipper strip section through said opening.

19. An extruded plastic zipper assembly, comprising:
a pair of opposingly aligned matching zipper strips having complementary reclosable interlocked zipper profiles with laterally extending confronting webs, and said webs being spaced apart adjacent to said zipper profiles by the height of the interlocked zipper profiles; and
complementary, non-zipper, stabilizing rib means on said webs located adjacent to edges of said webs remote from said profiles for maintaining said webs through their extent substantially parallel to one another in said spaced relation so that said zipper assembly can be stacked in substantially uniform parallel relation with said zipper assemblies;
each of said sections having sufficient linear stiffness to remain substantially straight in the stacked relationship and permitting the strips to remain substantially straight as they are fed forward to be cut and dropped and stacked in a receiving package.

20. An assembly according to claim 19, wherein said rib means comprise ribs integral with said webs and having crowns in abutting relation.

21. An assembly according to claim 19, wherein said rib means comprise a plurality of like ribs located, on each web, in spaced parallel relation to one another and to said profiles, and said ribs having abutting crowns.

22. An assembly according to claim 19, wherein said zipper profiles are located along one of the edges of said webs, and said rib means comprise a plurality of spaced parallel ribs located adjacent to opposite edges of said webs.

23. An assembly according to claim 20, in combination with a bag or package having walls with mouth-defining confronting wall flanges, said webs being fixedly attached to and between said wall flanges with said ribs located adjacent to said wall flanges.

24. A combination according to claim 23, wherein said webs adjacent to said rib means provide pull flanges adapted to be pulled apart for opening said interlocked zipper profiles, and said rib means provide a stiffening structure and facilitate digital grasping of said pull flanges.

25. A combination according to claim 24, wherein said wall flanges extend beyond said zipper assembly and are secured together in tamper evident manner.

26. An assembly according to claim 19, in a predetermined length section stacked in combination with a plurality of like assembly sections in parallel relation within a handling container.

27. A combination according to claim 26, wherein said container forms a dispensing magazine having means for dispensing the stack of zipper assembly sections from the magazine one at a time.

* * * * *